Sept. 18, 1934.  C. G. SUITS  1,974,318
ELECTRICAL SYSTEM PROVIDING SEQUENCE OPERATION
Original Filed Oct. 22, 1932

Inventor:
Chauncey G. Suits,
by Chas. E. Tullar
His Attorney.

Patented Sept. 18, 1934

1,974,318

UNITED STATES PATENT OFFICE 1,974,318

ELECTRICAL SYSTEM PROVIDING SEQUENCE OPERATION

Chauncey G. Suits, Schenectady, N. Y., assignor to General Electric Company, a corporation of New York Application October 22, 1932, Serial No. 639,133
Renewed February 17, 1934

8 Claims. (Cl. 171—97)

My invention relates to electrical systems containing a plurality of units which operate in a definite sequence. More particularly it relates to a system comprising a plurality of series of units such as electric lamps whereby a wave of operation of the units or lamps progresses along each series. It is one object of my invention to provide an improved system of this character wherein the operation of one unit depends upon the simultaneous or combined operation of a plurality of other units of the system. Another object is the provision in such a system of means whereby if the wave of operation in one series reaches a certain point in that series before the wave of operation in another series reaches a certain point in that other series, further progress of the wave in the one series will be delayed until the wave in the other series reaches the said point in that series.

My invention will be better understood from the following description taken in connection with the accompanying drawing, and its scope will be pointed out in the appended claims.

Figure 1:
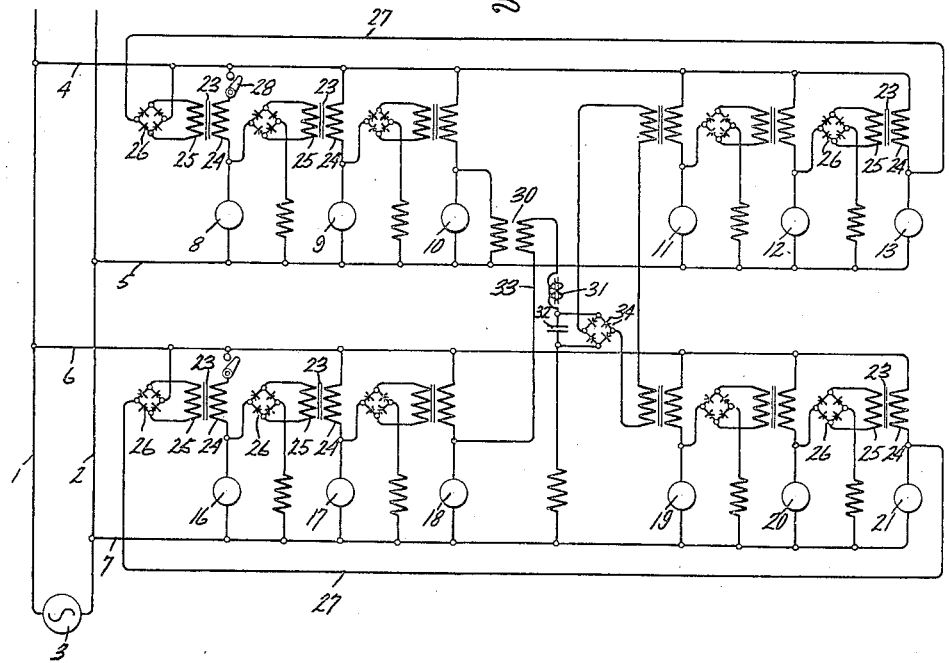
Figure 2:
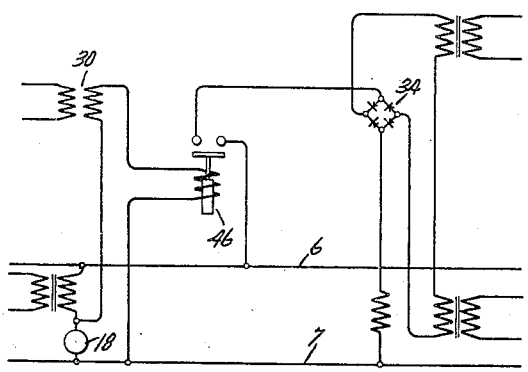
Figure 3:
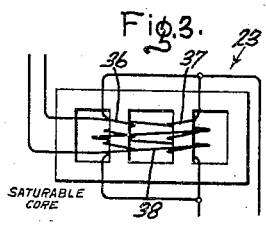
Figure 4:
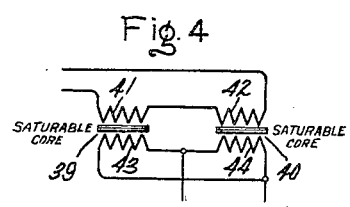

Referring to the drawing, Fig. 1 is a circuit diagram illustrating one form of my invention; Fig. 2 is a similar diagram illustrating a modified form; and Figs. 3 and 4 illustrate two forms of saturable core reactor which may be used in the apparatus illustrated in Figs. 1 and 2.

In Fig. 1 an alternating current supply circuit is shown at 1 and 2 which may be connected with any suitable source of alternating current illustrated at 3, which for example, may be a 110 volt, 60 cycle source. Connected with this supply circuit are a plurality of supply feeder circuits, two in the present case, shown at 4, 5 and 6, 7. It will be understood that three or more supply feeder circuits may be employed if desired but to simplify the description I have chosen to illustrate but two such feeder circuits. Connected with each feeder circuit is a series of branch circuits each containing a load device, such as an incandescent lamp, and means for controlling the current supplied to the lamp. The load devices or lamps may for example be the lamps of an electric sign, which it is desired to have operate at a certain sequence, and are represented by numerals 8, 9, 10, 11, 12 and 13 of the one series supplied by feeders 4 and 5 and by 16, 17, 18, 19, 20 and 21 of the other series supplied by feeders 6 and 7. The control device in each branch circuit is a saturable core reactor 23 having the alternating current winding 24 and the direct current saturating winding 25.

The winding 25 of each of these reactors is, with the exception of the reactor in the first branch circuit and that supplied by the rectifier 34, shown connected to be controlled by the lamp of the preceding branch through a full wave rectifier of well known construction represented at 26. The rectifier 26 which supplies the reactor of the first branch circuit connects by the lead 27 across the alternating current winding of the reactor of the last branch circuit. It may, however, be connected across any of the other reactors of that series depending upon the frequency of operation which it is desired the lamps shall have. It will be noted that the several branch circuits of this series are all of similar construction with the exception of the first branch circuit which in addition to the apparatus in each of the other branches contains the control switch 28.

The second series of branch circuits, namely, those connected with the feeders 6 and 7 is similar in all respects to that just described and the control apparatus therein is designated by the same reference numbers.

At a point intermediate the ends of each series I have provided means, which I shall now describe, for controlling the advancing wave of operation in the two series, whereby if the wave in the one series progresses more rapidly than the wave in the other series the more rapidly advancing wave will be retarded until the wave in the other series has caught up to it, thereafter the two waves will start together down the remainder of the series. Connected across lamp 10 of the first series is the primary of the transformer 30 whose secondary connects in series with the reactor 31 and capacitor 32 across lamp 18 of the second series. There is thereby formed the resonant circuit 33 which becomes resonant only when the sum of the voltages across lamps 10 and 18 reaches a predetermined value. This value may, for example, be that obtained when both lamps are fully illuminated; hence a resonant condition exists in circuit 33 only at such times that both lamps 10 and 18 are illuminated. The resonant condition of circuit 33 is used to control the reactors in circuit with lamps 11 and 19. In the preferred form of my invention, and as illustrated by Fig. 1, this control is effected by the use of the full wave rectifier 34, which is shown, for example, connected across the capacitor 32, and which supplies rectified saturating current to the reactors in circuit with lamps 11 and 19.

For the sake of simplicity, I have shown the saturable core reactors 23 in a purely diagrammatic manner in Figs. 1 and 2. Their actual construction may, for example, be as shown in Fig. 3 where the core of reactor has four legs, the winding 24 of which comprises the coils 36 and 37 wound in opposite directions on the two inner legs of the core and connected in parallel in the alternating current branch circuit, and the saturating winding 25 of which comprises the single coil 38 which surrounds both of said legs. A reactor of this type is disclosed in the Alexanderson Patent No. 1,328,610 of January 20, 1920. Instead of a single core reactor I may employ two separate transformers 39 and 40, as shown diagrammatically in Fig. 4. These transformers respectively have saturating windings 41 and 42 which are shown connected in series and alternating current windings 43 and 44 shown connected in parallel. Windings 43 and 44 are shown reversed in order to prevent alternating current from being induced in the direct current circuit.

With the arrangement shown in Fig. 1, when the control switches 28 of the two series are open, the lamps 8 and 16 not only are dark but each of the other lamps also is dark for the reason that in the unsaturated condition of the several reactors the inductance offered by each, with the exception of the reactors controlling lamps 8 and 16, is too high to permit sufficient current to pass for the illumination of the lamps in series therewith. Since the impedance of the windings 24 in series with lamps 15 and 21 is high, the direct current supplied by the rectifiers 26 to the reactors of the first branch circuits is sufficiently large to saturate the cores of those reactors, which in accordance with the characteristics of saturable core reactors, decreases the inductance of the alternating current windings. Hence when the switches 28 are closed, lamps 8 and 16 become illuminated. The potential drop across lamps 8 and 16 now causes a saturating current to be supplied through the rectifiers 26 connected therewith to the saturating windings 25 of the reactors in circuit with lamps 9 and 17. The resulting saturation of these reactors reduces the impendance of windings 24 thereof to such an extent that lamps 9 and 17 become illuminated. The impedance of windings 24 of these reactors does not change instantaneously but inherently experiences a time delay which is fundamentally due to the relatively long time constant of the closed winding which characterizes reactors of this type. Hence lamps 9 and 17 are illuminated an appreciable time after the illumination of lamps 8 and 16. In a similar manner the increased potential difference across lamps 9 and 17 due to their illumination operates to cause the subsequent illumination of lamps 10 and 18 and so on throughout the whole of both series, each successive lamp of a series becoming illuminated after the illumination of the previous lamp of that series. This time delay in the operation of the successive lamps is due in the greater part to the time constant of the successive saturable core reactors and in some degree to the characteristics of the successive lamps, since the rectifiers are not energized until the voltage rises across the lamp associated therewith which in turn does not occur until the filament has attained a high temperature.

When the last lamps 13 and 21 of the two series are illuminated the impedance of the reactors in series therewith is relatively low and the resulting current supplied through the rectifier to the reactor in series with first lamps 8 and 16 is too low to produce saturation. Hence the impedance of the reactors in circuit with the lamps 8 and 16 increases and extinguishes those lamps. The extinguishing of lamps 8 and 16 likewise restores the reactors in circuit with lamps 9 and 17 to their original condition of non-saturation, whereby lamps 9 and 17 are extinguished, and so on throughout the entire series. Thus it will be seen that the illumination of the several lamps of the series travels in a wave throughout the entire length of both series and the length of each wave is governed by the number of branch circuits between those which are interconnected by the leads 27. Apparatus such as shown in Fig. 1 and described above but comprising a single series of branch circuits is disclosed in my copending application, Serial No. 582,801, filed December 23, 1931, and assigned to the same assignee as my present application.

If in the case of the multiple series apparatus which I have described above the wave of operation reaches lamp 10 of the one series before the corresponding wave reaches lamp 18 of the other series, the progress of the wave in the first series will be delayed until the wave of the second series reaches lamp 18. This is due to the fact that circuit 33 will not become resonant until the voltage applied thereto equals that supplied by the illumination of both lamps 10 and 18. Upon reaching a resonant condition, however, circuit 33 supplies saturating current to the reactors controlling lamps 11 and 19 and the wave of illumination is then caused to continue on down both series. Likewise, if the wave of illumination reaches lamp 18 before the wave reaches lamp 10 the first wave is delayed pending the arrival of the second wave when the waves are caused to continue on down the series.

In certain cases I may employ a mechanical contactor or relay instead of the resonant circuit 33, such an arrangement being illustrated by Fig. 2. The relay is shown at 46, the winding of which is connected in series with the secondary of transformer 30 across lamp 18. The relay is adjusted to close only when both lamps 10 and 18 become illuminated thereby supplying saturating current through the rectifier 34 to the reactors which follow in both series.

What I claim as new and desire to secure by Letters Patent of the United States is:

1. A sequence operating system comprising an alternating current supply circuit, a plurality of branch circuits connected therewith, means for causing the independent actuation of certain of said branch circuits and a resonant circuit responsive to the combined actuation of said certain branch circuits for controlling the actuation of another of said branch circuits.

2. A sequence operating system comprising an alternating current supply circuit, a plurality of branch circuits connected therewith, means for independently controlling the current in each of certain of said branch circuits, and a resonant circuit responsive to the combined current in said certain branch circuits for controlling the operation of another of said branch circuits.

3. A sequence operating system comprising an alternating current supply circuit, a plurality of series of sequence operating branch circuits connected therewith and means responsive to the simultaneous operation of certain branch circuits of the respective series for controlling another branch circuit.

4. A sequence operating system comprising an alternating current supply circuit, a plurality of series of sequence operating branch circuits connected therewith and means responsive to the simultaneous operation of certain branch circuits of the respective series for controlling another branch circuit of each series.

5. A sequence operating system comprising an alternating current supply circuit, a plurality of series of sequence operating branch circuits connected therewith each including a load device and means responsive to the combined operation of the load devices in certain branch circuits of the respective series for controlling the operation of the load device in another branch circuit.

6. A sequence operating system comprising an alternating current supply circuit, a plurality of series of sequence operating branch circuits connected therewith each including a load device and means comprising a resonant circuit responsive to the combined operation of the load device in a certain branch circuit of each series for controlling the operation of the load devices in other branch circuits.

7. A sequence operating system comprising an alternating current supply circuit, a plurality of series of sequence operating branch circuits connected therewith each including a load device and means comprising a resonant circuit connected to respond to the combined potential drop across load devices in certain branch circuits of each series for controlling the remaining branch circuits of the series.

8. A sequence operating system comprising an alternating current supply circuit, a plurality of series of sequence operating branch circuits connected therewith each including a load device, a resonant circuit connected to be actuated by the sum of the voltages obtained from the load devices of a certain branch circuit of each series, saturable core reactors for controlling subsequent branch circuits of said series and means including a rectifier for connecting the resonant circuit with said reactors.

CHAUNCEY G. SUITS.